US00RE50669E

(19) United States
(12) Reissued Patent
Baldemair et al.

(10) Patent Number: US RE50,669 E
(45) Date of Reissued Patent: Nov. 18, 2025

(54) NETWORK NODES AND METHODS FOR ENABLING ACCESS TO A RADIO NETWORK NODE

(71) Applicant: TELEFONAKTIEBOLAGET L M ERICSSON (PUBL), Stockholm (SE)

(72) Inventors: Robert Baldemair, Solna (SE); Jung-Fu Cheng, Fremont, CA (US); Mattias Frenne, Uppsala (SE); Havish Koorapaty, Saratoga, CA (US); Daniel Chen Larsson, Lund (SE)

(73) Assignee: Telefonaktiebolaget LM Ericsson (publ), Stockholm (SE)

(21) Appl. No.: 17/115,494

(22) Filed: Dec. 8, 2020

Related U.S. Patent Documents

Reissue of:
(64) Patent No.: 10,172,131
Issued: Jan. 1, 2019
Appl. No.: 14/779,815
PCT Filed: Mar. 25, 2013
PCT No.: PCT/SE2013/050331
§ 371 (c)(1),
(2) Date: Sep. 24, 2015
PCT Pub. No.: WO2014/158061
PCT Pub. Date: Oct. 2, 2014

(51) Int. Cl.
*H04L 12/50* (2006.01)
*H04L 5/00* (2006.01)
(Continued)

(52) U.S. Cl.
CPC ..... *H04W 72/0453* (2013.01); *H04L 5/0053* (2013.01); *H04W 72/20* (2023.01); *H04L 5/003* (2013.01); *H04W 72/23* (2023.01)

(58) Field of Classification Search
CPC ..... H04W 64/006; H04W 72/0406; H04W 72/042; H04W 72/0453; H04L 5/003; H04L 5/0053
See application file for complete search history.

(56) References Cited

U.S. PATENT DOCUMENTS

2013/0111584 A1* 5/2013 Coppock ..... H04L 63/145 726/22

FOREIGN PATENT DOCUMENTS

WO 2010118382 A1 10/2010
WO 2013006101 A1 1/2013

OTHER PUBLICATIONS

Nokia et al., "Mapping of Control Channel Elements to the Resource Elements", 3GPP TSG RAN WG1 #49 Meeting, R1-072302, Kobe, Japan, May 7-11, 2007, 1-10.
(Continued)

*Primary Examiner* — Matthew E Heneghan
(74) *Attorney, Agent, or Firm* — Murphy, Bilak & Homiller, PLLC

(57) ABSTRACT

A wireless device (120) and a method for enabling access to a radio network node (110) as well as a radio network node (110) and a method for enabling the wireless device (120) to enable access to the radio network node (110) are disclosed. The wireless device (120) supports a first transmission bandwidth. The radio network node (110) operates a carrier on a second transmission bandwidth. The first transmission bandwidth is narrower than the second transmission band width. The wireless device (120) obtains (202) information about the carrier. The wireless device (120) determines (206) a mapping scheme for mapping a set of enumerable elements, e.g. resource blocks or sequence elements, to frequency ranges based on the information about the carrier.

6 Claims, 5 Drawing Sheets

(51) Int. Cl.

| | |
|---|---|
| ***H04W 72/04*** | (2023.01) |
| ***H04W 72/0453*** | (2023.01) |
| ***H04W 72/20*** | (2023.01) |
| *H04W 72/23* | (2023.01) |

(56) References Cited

OTHER PUBLICATIONS

NTT Docomo, "On the Need of Common Search Space for E-PDCCH", 3GPP TSG RAN WG1 Meeting #68bis, R1-121476, Jeju, Korea, Mar. 26-30, 2012, 1-4.

Unknown, Author, "Mapping of Control Channel Elements to the Resource Elements", Nokia, Nokia Siemens Networks, 3GPP TSG RAN WG1 #49 Meeting, R1-072302, Kobe, Japan, May 7-11, 2007, 1-10.

Unknown, Author, "On the Need of Common Search Space for E-PDCCH", NTT DOCOMO, 3GPP TSG RAN WG1 Meeting #68bis, R1-121476, Jeju, Korea, Mar. 26-30, 2012, 1-4.

* cited by examiner

NETWORK NODES AND METHODS FOR ENABLING ACCESS TO A RADIO NETWORK NODE

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

*This application is a reissue of U.S. Patent application Ser. No. 14/779,815, filed Mar. 25, 2013, granted as U.S. Pat. No. 10,172,131 on Jan. 1, 2019, which is a U.S. National Stage Filing under 35 U.S.C. § 371 of International Patent Application Serial No. PCT/SE2013/050331 filed Mar. 25, 2013 and entitled "Network Nodes and Methods for Enabling Access to a Radio Network Node", which are hereby incorporated by reference in their entireties.*

TECHNICAL FIELD

Embodiments herein relate to wireless communication systems, such as telecommunication systems. In particular, a wireless device and a method therein for enabling access to a radio network node as well as a radio network node and a method therein for enabling the wireless device to enable access to the radio network node are disclosed.

BACKGROUND

Within the Third Generation Partnership Project (3GPP), specifications for telecommunication systems are proposed and decided upon. One such telecommunication system is called Long Term Evolution (LTE).

According to LTE, Orthogonal Frequency Division Multiplexing (OFDM) is used for transmission in downlink and Discrete Fourier Transform (DFT)-spread OFDM is used for transmission in uplink. Downlink refers to transmission from a so called eNB to a user equipment. Uplink refers to transmission from the user equipment to the eNB.

An LTE downlink physical resource, often referred to as a resource element, has a certain extension in time and frequency domains. In the frequency domain, the resource element extends over, or corresponds to, one so called OFDM subcarrier. In the time domain, the resource element, extends over, or corresponds to, one so called OFDM symbol interval.

In the time domain, LTE downlink transmissions are organized into radio frames of 10 ms, where each radio frame consists of ten equally-sized subframes. Each subframe has a length of 1 ms.

Furthermore, allocation of the resource elements in LTE is performed while organizing the resource elements into Resource Blocks (RB). A resource block corresponds to one slot, 0.5 ms, in the time domain and 12 contiguous subcarriers in the frequency domain. Each subcarrier is 15 kHz wide. A pair of two adjacent resource blocks in the time domain, 1.0 ms, is known as a resource block pair. Resource blocks are numbered in the frequency domain, starting with 0 from one end of the transmission bandwidth.

The notion of Virtual Resource Blocks (VRB) and Physical Resource Blocks (PRB) has been introduced in LTE. The actual resource allocation to a user equipment is made in terms of VRB pairs. There are two types of resource allocations, localized and distributed. In the localized resource allocation, a VRB pair is directly mapped to a PRB pair, hence two consecutive and localized VRB are also placed as consecutive PRBs in the frequency domain. On the other hand, the distributed VRBs are not mapped to consecutive PRBs in the frequency domain; thereby providing frequency diversity for data channel transmitted using these distributed VRBs.

In order to efficiently and dynamically use radio spectrum, LTE supports flexible allocation of transmission bandwidths. The pre-determined transmission bandwidths are: 1.4 MHz, 3 MHz, 5 MHz, 10 MHz, 15 MHz, and 20 MHz. Therefore, in order to fulfill LTE specifications, any user equipment, fulfilling the LTE specifications, must support all of the aforementioned transmission bandwidths.

In LTE there are reference signals, which are sequences consisting of sequence elements, each of which associated with a sequence element number. The sequence elements are mapped to sub-carriers that are distributed with regular or irregular pattern over bandwidth.

In the following description, resource blocks and sequence elements are denoted as examples of enumerable elements.

A known LTE system comprises a radio base station, such as an eNB. A user equipment is located in a cell served by the radio base station. When the user equipment attempts to access a carrier of the radio base station, the user equipment receives various signalling about the carrier from the radio base station. At least some of the signalling is received on a broadcast channel, which is common to all of the pre-determined transmission bandwidths. The signalling informs the user equipment of the transmission bandwidth of the carrier. Accordingly, the user equipment selects to use a transmission bandwidth that matches the transmission bandwidth of the carrier.

A disadvantage, in connection with the above mentioned transmission bandwidth selection process of the LTE system, is that the number of available bandwidths is limited to a number of pre-determined bandwidths. As a consequence, only a user equipment with a transmission bandwidth that exactly matches the bandwidth of the carrier is able to access, e.g. able to camp on it, the radio base station.

SUMMARY

An object of the method described herein is how to increase performance in a wireless communication system.

According to an aspect, the object is achieved by a method in a wireless device for enabling access to a radio network node. The wireless device supports a first transmission bandwidth. The radio network node operates a carrier with a second transmission bandwidth. A set of enumerable elements is associated with the second transmission bandwidth. The first transmission bandwidth is narrower than the second transmission bandwidth. The wireless device obtains information about the carrier. The wireless device determines a mapping scheme for mapping the set of enumerable elements to frequency ranges based on the information about the carrier.

According to another aspect, the object is achieved by a wireless device configured to enable access to a radio network node. The wireless device supports a first transmission bandwidth. The radio network node operates a carrier with a second transmission bandwidth. A set of enumerable elements is associated with the second transmission bandwidth. The first transmission bandwidth is narrower than the second transmission bandwidth. The wireless device comprises a processing circuit configured to obtain information about the carrier, and to determine a mapping scheme for mapping the set of enumerable elements to frequency ranges based on the information about the carrier.

According to a further aspect, the object is achieved by a method in a radio network node for enabling a wireless device to enable access to the radio network node. The wireless device supports a first transmission bandwidth. The radio network node operates a carrier with a second transmission bandwidth. A set of enumerable elements is associated with the second transmission bandwidth. The first transmission bandwidth is narrower than the second transmission bandwidth. The radio network node obtains a mapping scheme for mapping the set of enumerable elements to frequency ranges. The mapping scheme maps a respective element associated with the set of enumerable elements to a respective frequency range from among the frequency ranges. The frequency ranges extend over the first transmission bandwidth. An element with a least element number and associated with the set of enumerable elements is mapped to a particular frequency range from among the frequency ranges. The particular frequency range is located at a center frequency of a center of the first transmission bandwidth. Elements associated with the set of enumerable elements increasing from the least element number are mapped towards higher and lower frequencies relative to the center frequency, alternatingly. The radio network node sends information about the carrier to the wireless device. The information about the carrier relates to the obtained mapping scheme.

According to another further aspect, the object is achieved by a radio network node configured to enable a wireless device to enable access to the radio network node. The wireless device supports a first transmission bandwidth. The radio network node operates a carrier with a second transmission bandwidth. A set of enumerable elements is associated with the second transmission bandwidth. The first transmission bandwidth is narrower than the second transmission bandwidth. The radio network node comprises a processing circuit configured to obtain a mapping scheme for mapping the set of enumerable elements to frequency ranges. The mapping scheme maps a respective element associated with the set of enumerable elements to a respective frequency range from among the frequency ranges. The frequency ranges extend over the first transmission bandwidth. An element with a least element number and associated with the set of enumerable elements is mapped to a particular frequency range from among the frequency ranges. The particular frequency range is located at a center frequency of a center of the first transmission bandwidth. Elements associated with the set of enumerable elements increasing from the least element number are mapped towards higher and lower frequencies relative to the center frequency, alternatingly. The processing circuit is further configured to send information about the carrier to the wireless device, wherein the information about the carrier relates to the obtained mapping scheme.

After the wireless device has obtained the information about the carrier, the wireless device is able to determine the mapping scheme for mapping the set of enumerable elements to frequency ranges based on the information about the carrier. In some examples, each of the frequency ranges comprises 12 contiguous subcarriers, which corresponds to an extension, or a width, in frequency of a resource block.

In existing LTE systems, no determination of the mapping scheme based on information about the carrier is performed when the first transmission bandwidth is narrower than the second transmission bandwidth. In fact, according to prior art, it is only when the first and second transmission bandwidths are equal that a pre-determined mapping scheme is applied and access to the radio network node is possible.

Thanks to that the wireless device determines the mapping scheme based on the information about the carrier, the determined mapping scheme will be adapted to the carrier of the radio network node even when the second transmission bandwidth is not one of the pre-determined transmission bandwidth mentioned in the background section. Thereby, consistent mapping of enumerable elements to frequency ranges in the wireless device as well as in the radio network node is enabled. Consequently, the wireless device will be able to access the carrier, which has a broader transmission bandwidth than the first transmission bandwidth of the wireless device. Thus, embodiments herein enable access even for wireless devices which have a transmission bandwidth that does not exactly match, e.g. is equal to, the transmission bandwidth of the carrier. Thereby, performance in terms of, e.g., number of wireless devices that may access the radio network node is increased. As a result, the above mentioned object is achieved.

Advantageously, the wireless device will be able to access a carrier having a transmission bandwidth other than one of the aforementioned pre-determined transmission bandwidths as long as the carrier has a transmission bandwidth that is wider than one of the transmission bandwidths supported by the wireless device.

BRIEF DESCRIPTION OF THE DRAWINGS

The various aspects of embodiments disclosed herein, including particular features and advantages thereof, will be readily understood from the following detailed description and the accompanying drawings, in which.

DETAILED DESCRIPTION

Figure 1:
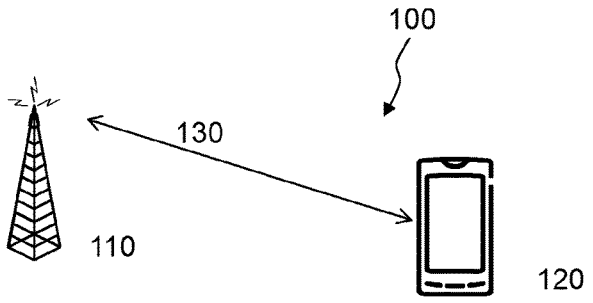
FIG. 1 is a schematic block diagram illustrating embodiments in an exemplifying wireless communication system.

Throughout the following description similar reference numerals have been used to denote similar elements, network nodes, parts, items or features, when applicable.

FIG. 1 depicts an exemplifying wireless communications system 100 in which embodiments herein may be implemented. In this example, the radio communications system 100 is a Long Term Evolution (LTE) system. In other examples, the wireless communication system may be a radio communication system such as Worldwide Interoperability for Microwave Access (WiMAX) or wireless technologies using the IEEE 802.11 family of standards, often referred to as "WiFi" for short.

The wireless communication system 100 comprises a radio network node 110. In this example, the radio network node 110 is an evolved Node B. In other examples, the radio network node 110 may be a control node controlling one or more Remote Radio Units (RRUs), a radio base station, an access point, a radio network controller, a base station controller, a relay, or the like.

Furthermore, a wireless device 120 is located in the vicinity of the radio network node 110. As used herein, the term "wireless device" may refer to user equipment, a mobile phone, a cellular phone, a Personal Digital Assistant (PDA) equipped with radio communication capabilities, a smartphone, a laptop or Personal Computer (PC) equipped with an internal or external mobile broadband modem, a tablet PC with radio communication capabilities, a portable electronic wireless device, a sensor device equipped with radio communication capabilities or the like. The sensor may be any kind of weather sensor, such as wind, temperature, air pressure, humidity etc. As further examples, the sensor may be a light sensor, an electronic switch, a microphone, a loudspeaker, a camera sensor etc.

The radio network node 110 and the wireless device 120 are configured to be able to communicate 130 with each other. The communication may be performed over a radio interface, such as Evolved Universal Terrestrial Radio Access Network (EUTRAN) or the like.

The wireless device 120 may support a plurality of pre-determined transmission bandwidths, e.g. a number of transmission bandwidths specified according to a 3GPP specification. The number of transmission bandwidths comprises a first transmission bandwidth.

The radio network node 110 operates a carrier with a second transmission bandwidth. In some examples, the number of transmission bandwidths does not comprise the second transmission bandwidth.

Figure 2:
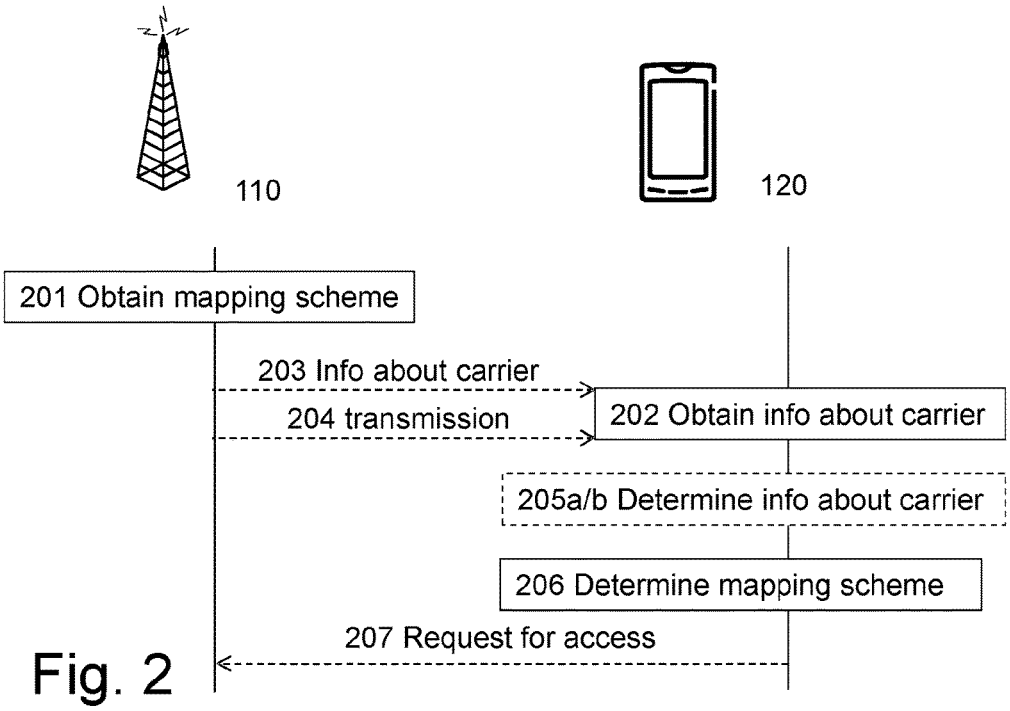
FIG. 2 is a combined signaling scheme and flowchart illustrating embodiments of the methods.

FIG. 2 illustrates an exemplifying method for enabling the wireless device 120 to access the carrier when implemented in the wireless communication system 100 of FIG. 1.

As mentioned, the wireless device 120 supports a first transmission bandwidth. The radio network node 110 operates a carrier with a second transmission bandwidth. A set of enumerable elements is associated with the second transmission bandwidth.

The first transmission bandwidth is narrower than the second transmission bandwidth. As an example, the first transmission bandwidth may be narrower than the second transmission bandwidth in a stepwise manner. That is to say, a difference between the first and second transmission bandwidths may be equal to a width of one frequency range, e.g. 12 contiguous subcarriers.

In some embodiments, the first transmission bandwidth is selected from the plurality of pre-determined transmission bandwidths. The second transmission bandwidth may be different from each of the transmission bandwidths from among the plurality of pre-determined transmission bandwidths. The second transmission bandwidth may be different from the plurality of pre-determined transmission bandwidths in that its extension in frequency is different, in that its mapping scheme is different, in that it is of a different release/version etc.

In order to enable access by the wireless device 120, some first embodiments and some second embodiments are described. The first embodiments need to be implemented in the radio network node 110 and the wireless device 120. In contrast, the second embodiments may be implemented by only the wireless device 120.

The following actions may be performed in any suitable order.

Action 201

This action applies to the first embodiments only.

In order for the radio network node 110 to be able to apply the first embodiments, the radio network node 110 is required to obtain a mapping scheme for mapping the set of enumerable elements to frequency ranges.

The mapping scheme may be configured as determined by an operator of a network within the wireless communication system 100. The operator may own and manage the network. The operator selects the mapping scheme according to some desired network planning. Information about the mapping scheme to use may be received by the radio network node 110 from a network node for managing network planning, which network node may be controlled by the operator.

In some examples, the mapping scheme may be determined by the radio network node 110 itself. For example, the radio network node 110 may detect a first number of user equipments that support a first mapping scheme and a second number of user equipments that support a second mapping scheme. Then, the radio network node 110 may select the first mapping scheme when the first number of user equipments is greater than the second number of user equipments. In other examples, the radio network node 110 may estimate traffic load, predicted or historical, for the first and second number of user equipments. Thereafter, the first mapping scheme is selected by the radio network node 110 if load for the first number of user equipments is greater than load for the second number of user equipments, and vice versa.

The mapping scheme maps a respective element associated with the set of enumerable elements to a respective frequency range from among the frequency ranges. The respective element number of an element associated with the set of enumerable elements may refer to each of those numbers that may map a respective frequency range which is located within the first transmission bandwidth. Those element numbers that map to frequency ranges located outside the first transmission bandwidth need not necessarily be mapped. The frequency ranges extend over the first transmission bandwidth, and thus also over the second transmission bandwidth, or at least partially over the second transmission bandwidth. An element with a least element number and associated with the set of enumerable elements is mapped to a particular frequency range from among the frequency ranges. This means that the least element number is less than all other element numbers of elements associated with the set of enumerable elements. The particular frequency range is located at a center frequency of a center of the first transmission bandwidth. Elements associated with the set of enumerable elements increasing from the least element number are mapped towards higher and lower frequencies relative to the center frequency, alternatingly.

In some examples, even element numbers are used for mapping of frequency ranges towards the higher frequencies and odd element numbers are used for mapping of frequency ranges towards the lower frequencies, or vice versa. The set of element numbers comprises the even and odd element numbers.

This will be explained in more detail in conjunction with FIGS. 4 and 5 below.

One way to implement the mapping scheme according to the first embodiment may be to extend a function for mapping from virtual enumerable elements to physical enumerable elements. For instance, when considering resource blocks as an example of enumerable elements, the mapping scheme may further map virtual resource blocks to frequency ranges via the resource blocks numbers. According to prior art, the function for mapping from virtual enumerable elements to physical enumerable elements is used to obtain distributed physical enumerable elements or pair wise located physical enumerable elements.

Each set of the sets of subcarriers may comprise 12 contiguous subcarriers.

Action 202

In order for the wireless device 120 to be able to correctly map the elements associated with the set of enumerable elements to frequency ranges in the same manner as the radio network node 110, the wireless device 120 obtains information about the carrier. The information about the carrier may be received from the radio network node 110 as explained in action 203 and/or the information about the carrier may be implicitly received from the radio network node 110 as explained in action 204.

However, as brief examples, the received information about the carrier may include information about a release number of the carrier as in action 203. Alternatively or additionally, the wireless device 120 may detect, as in action 204, a scrambling mask of a signal from the radio network node 110 from which the information about the carrier may be derived. Thus, the wireless device 120 obtains, i.e. implicitly receives, information about the carrier.

Action 203

In order for the wireless device 120 to be able to use the information about the carrier in action 205a and 205b, the wireless device 120 may receive the information about the carrier from the radio network node 110. The information about the carrier may relate to, or may be associated with, the obtained mapping scheme. The information about the carrier may comprise one or more of:

a first indication for indicating the carrier type;

release information of the carrier;

configuration of the carrier;

a second indication for indicating the second transmission bandwidth;

a third indication for indicating a type of the mapping scheme applied to the carrier by the radio network node 110; and a carrier frequency of the carrier.

The first indication may indicate whether the carrier is a primary cell (PCell) or secondary cell (SCell), a booster or anchor carrier. Furthermore, the first indication may be an explicit parameter on a Broadcast Channel (BCH), which parameter indicates the carrier type from which the used mapping scheme may be deduced according to a pre-determined scheme for finding a mapping scheme corresponding to the first indication.

The configuration of the carrier may indicate start and end frequencies of the carrier or start and width of the carrier or center and width of the carrier. This information may be used to conclude which mapping scheme is used according to another pre-determined scheme for finding a mapping scheme corresponding to the configuration of the carrier.

The second indication for indicating the second transmission bandwidth may be DL Bandwidth and UL Bandwidth (dl-Bandwidth and ul-Bandwidth) which are known from 3GPP specifications.

Generally, for the information about the carrier, pre-determined schemes for finding a mapping scheme corresponding to the information about the carrier must be supplied to the wireless device 120. For example, the pre-determined schemes for finding the mapping scheme may be provided on another carrier, specified by an applicable standard specification or obtained from a Subscriber Identity Module (SIM) card comprised in the wireless device 120.

Action 204

In order to detect the information about the carrier in action 205a or 205b, the wireless device 120 may receive a transmission, or one or more transmissions, on a broadcast channel (BCH) from the radio network node 110. The transmission(s) may comprise synchronization and/or reference signals. This action may be similar to that the first indication for indicating the carrier type is a synchronization signal and/or a reference signal.

Action 205a

When the transmission on for example BCH is received in action 204, the wireless device 120 may determine the information about the carrier based on a scrambling mask of a Cyclic Redundancy Check (CRC) of the transmission or a CRC of the transmission. The wireless device 120 has earlier been informed about that the scrambling mask corresponds to a particular release of the carrier, or that a particular mapping scheme is used. For example, information about which release of the carrier the scrambling mask corresponds to may have been provided on another carrier, specified by an applicable standard specification or obtained from a Subscriber Identity Module (SIM) card comprised in the wireless device 120.

Action 205b

When the transmission comprises synchronization and/or reference signals in action 204, the wireless device 120 may determine the information about the carrier based on duration between the synchronization and/or reference signals. When determining the information about the carrier, the wireless device 120 used a further pre-determined scheme for finding the information about the carrier corresponding to a detected duration between synchronization and/or reference signals.

Action 206

The wireless device 120 determines a mapping scheme for mapping the set of enumerable elements to frequency ranges based on the information about the carrier. In this manner, the mapping scheme that will map an enumerable element associated with the first set to the same frequency ranges in both the radio network node 110 and the wireless device 120 is determined or selected. Thus, access by the wireless device 120 to the radio network node 110 is enabled.

Each respective frequency range may comprise at least one subcarrier or may comprise a respective set of 12 contiguous subcarriers of a plurality of sets of 12 contiguous subcarriers extending over at least the first transmission bandwidth.

According to the first embodiments, the mapping scheme may map each element associated with the set of enumerable elements to a respective frequency range from among the frequency ranges. The frequency ranges may extend over the first transmission bandwidth. An element with a least element number and associated with the set of enumerable elements may be mapped to a particular frequency range from among the frequency ranges. The particular frequency range may be located at a center frequency of a center of the first transmission bandwidth. Elements associated with the set of enumerable elements increasing from the least element number may be mapped towards higher and lower frequencies relative to the center frequency, alternatingly. This will be explained in more detail with reference to FIGS. 4 and 5.

Similarly as in action 201, in some examples, even element numbers are used for mapping of frequency ranges towards the higher frequencies and odd element numbers are used for mapping of frequency ranges towards the lower frequencies, or vice versa.

Similarly as in action 201, the mapping scheme may further map virtual enumerable elements to frequency ranges via the set of enumerable elements.

According to the second embodiments, the mapping scheme may further map the set of enumerable elements to frequency ranges via a further set of enumerable elements associated with the first transmission bandwidth.

The element number of each element associated with the further set of enumerable elements may be determined by subtracting an offset from the element number of an element associated with the set of enumerable elements.

The offset may be based on a difference between a greatest element number, referred to as A, of an element associated with the set of enumerable elements and a greatest element number, referred to as B, of an element associated with the further set of enumerable elements. The offset may be rounded, up or down, to an integer. Mathematical floor function may be used for rounding downwards and mathematical ceil function may be used for rounding upwards. As an example, the offset, referred to as O, may be calculated as a function of A minus B, i.e. f(A−B). For example, O=(A−B)/2 and then floor(O) or ceil(O).

In some examples, the offset may be set such that the first transmission bandwidth and the second transmission bandwidth are not centered relative each other.

The offset may further be determined based on one or more of:

time parameters;

subframe number;

radio frame number;

identification of the wireless device 120;

identification of cell of the radio network node 110.

In some examples, the wireless device 120 may be placed non-centrally in the second transmission bandwidth. Therefore, the offset may depend on an identification of the wireless device 120.

On different carriers, a different placement of the wireless devices may be employed. Therefore, the offset may depend on the identification of the cell of the radio network node 110.

The wireless devices may frequency-hop within the second bandwidth. Hence, the offset may depend on time parameters, such as subframe number, radio frame number.

Action 207

Now that the wireless device 120 has made sure that the enumerable elements are correctly mapped to frequency ranges, it is possible to communicate with the radio network node 110. Thus, the wireless device 120 may send to the radio network node 110, a request for access to the radio network node 110. As an example, the request may be a random access request or the like. Using the obtained mapping scheme the device can also receive transmission from the network node.

Figure 3:
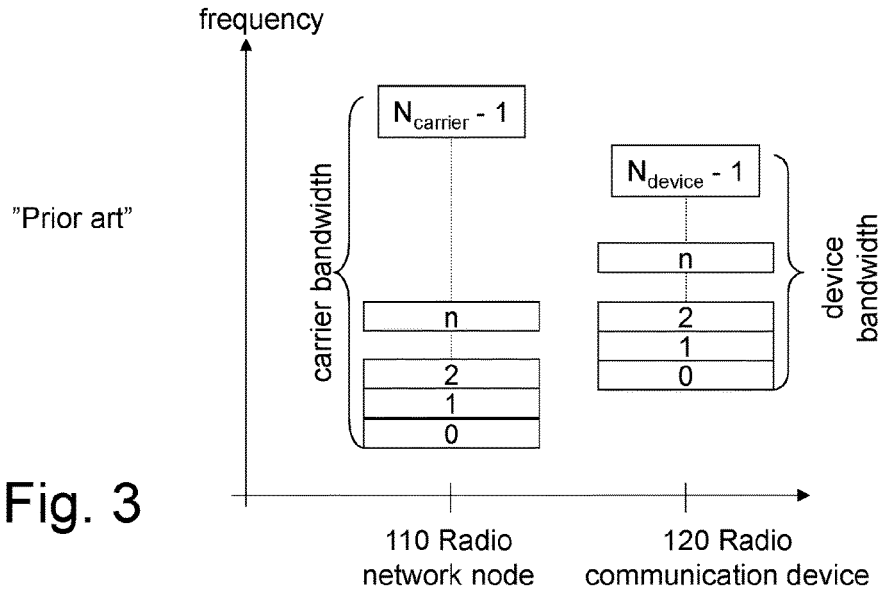
FIG. 3 is a diagram illustrating a numbering scheme of enumerable elements according to prior art.

In order to better appreciate, the advantages and benefits of the embodiments herein, a brief description of a numbering scheme of enumerable elements according to prior art is presented with reference to FIG. 3. Note, here is shown a numbering scheme according to prior art together with a carrier bandwidth that is not one of the plurality of predetermined transmission bandwidths.

For reasons of out-of-band emission requirements, it is not desirable to allow a user equipment to use a transmission bandwidth, which is wider than a transmission bandwidth of the carrier, to access the carrier. Still, it is not possible, with the known LTE system, to allow a user equipment to use a transmission bandwidth, which is narrower than a transmission bandwidth of the carrier, to enable access to the carrier. Therefore, FIG. 3 shows a carrier bandwidth that is wider than a device bandwidth.

From FIG. 3 for the radio network node 110, it can be seen that a first sequence of element numbers starts at one end of a carrier bandwidth with 0 and continues until $N_{carrier}-1$ at the other end of the carrier bandwidth. $N_{carrier}$ denotes the number of enumerable elements in the transmission bandwidth of the radio network node 110.

Likewise, from FIG. 3 for the wireless device 120, it can be seen that a second sequence of element numbers starts at one end of a device bandwidth with 0 and continues until $N_{device}-1$ at the other end of the device bandwidth. $N_{device}$ denotes the number of enumerable elements in the transmission bandwidth of the wireless device 120.

As mentioned, the carrier bandwidth represents a transmission bandwidth that is not one of the pre-determined transmission bandwidths. The wireless device 120 supports a narrower transmission bandwidth in view of the carrier bandwidth. The element numbering always starts at 0 at the lower band edge, i.e. at the lowest frequency. Therefore, a given element number n addresses different enumerable elements for the radio network node 110 and the wireless device 120.

Figure 4:
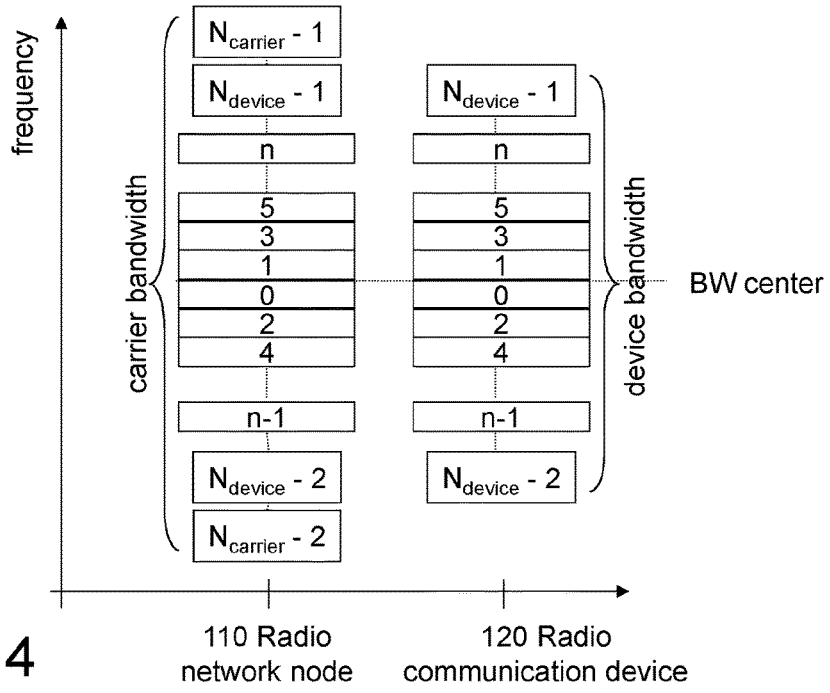
FIG. 4 is another diagram illustrating a numbering scheme of enumerable elements according to embodiments of the present invention.
Figure 5:
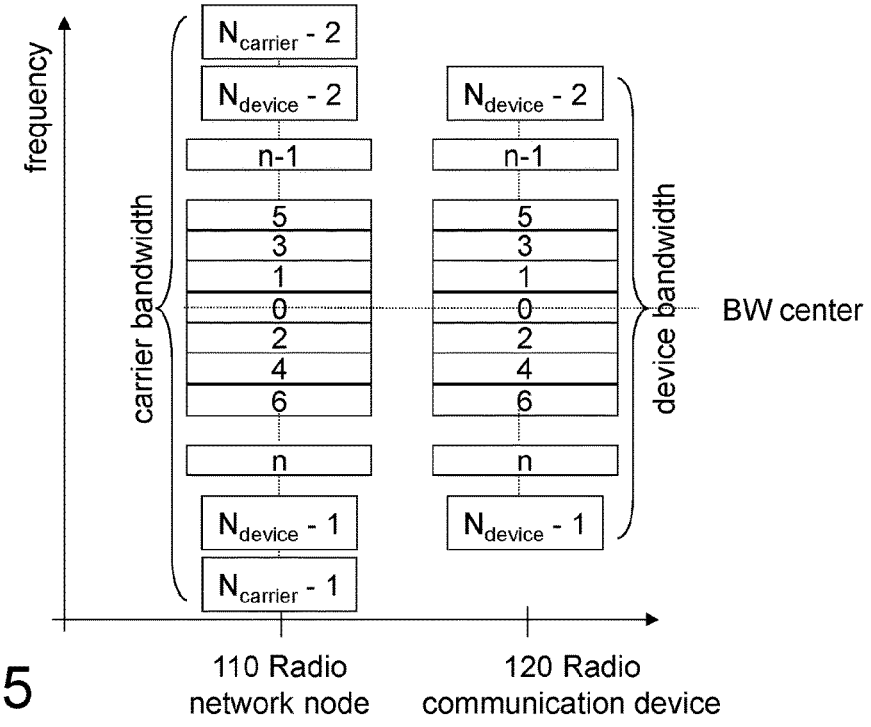
FIG. 5 is a further diagram illustrating a numbering scheme of enumerable elements according to embodiments of the present invention.
Figure 6:
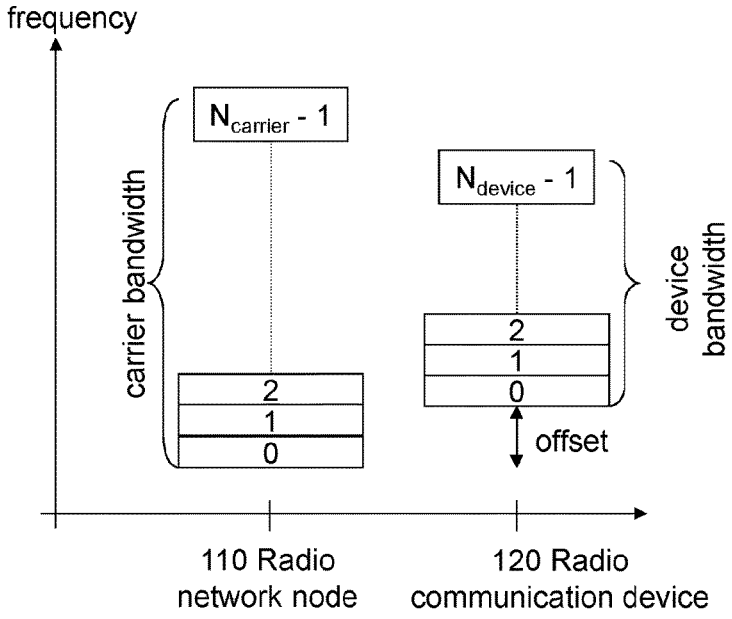
FIG. 6 is yet another diagram illustrating a numbering scheme of enumerable elements according to embodiments of the present invention.

In FIGS. 4-6, a device bandwidth is an example of the first transmission bandwidth and a carrier bandwidth is an example of the second transmission bandwidth. In these examples, numbering of frequency ranges is exemplified by "element numbers". Also, frequency ranges are exemplified by a width of an enumerable element in the frequency domain.

FIG. 4 is a diagram illustrating an example of the first embodiments, in which the center frequency is between a pair of frequency ranges that directly enclose the center frequency. Here, the number of frequency ranges is an even number.

In FIG. 4 and in FIG. 5 as well, $N_{device}$ is less than $N_{carrier}$. $N_{carrier}$ denotes the number of enumerable elements of the set of enumerable elements. $N_{device}$ denotes the number of element of a further set of enumerable elements. $N_{device}$ corresponds to those element numbers that the wireless device 120 can use or support. Since element numbers of the set of enumerable elements begin at zero, 0, as the least element number, $N_{device}-1$ and $N_{carrier}-1$ are the greatest, or highest, element numbers.

FIG. 5 is a diagram illustrating another example of the first embodiments, in which a center frequency range encloses the center frequency. Here, the number of frequency ranges is an odd number.

In both FIG. 4 and FIG. 5, $N_{device}-1$ is adjacent to $N_{carrier}-1$. This is merely an example. In other examples, there may be one or more element numbers between $N_{device}-1$ and $N_{carrier}-1$. The number of enumerable elements between $N_{device}-1$ and $N_{carrier}-1$ depends on a difference between the first and second transmission bandwidth.

FIG. 6 is a diagram illustrating an example of the second embodiments.

$N_{device}-1$ denotes the greatest element number of an element associated with the further set of enumerable elements. $N_{carrier}-1$ denotes the greatest element number of an element associated with the set of enumerable elements.

When studying FIGS. 4-6 it shall be noted that for the first embodiments the same element numbering applies to both the radio network node 110 and the wireless device 120. In contrast, for the second embodiments, the radio network node 110 applies an element numbering scheme according to prior art, while the wireless device 120 translates, or maps, the element numbers of elements associated with the set of enumerable elements via element numbers of elements associated with the further set of enumerable elements to physical enumerable elements.

Figure 7:
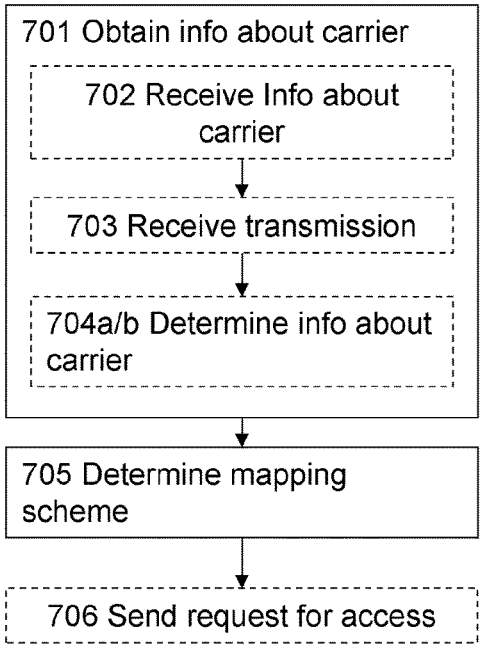
FIG. 7 is a flowchart illustrating embodiments of the method in the wireless device.

With reference to FIG. 7, embodiments of the method in the wireless device 120 for enabling access to the radio network node 110 are described.

As mentioned, the wireless device 120 supports a first transmission bandwidth. The radio network node 110 operates a carrier with a second transmission bandwidth. A set of enumerable elements is associated with the second transmission bandwidth. The first transmission bandwidth is narrower than the second transmission bandwidth.

The following actions may be performed in any suitable order.

Action 701

The wireless device 120 obtains information about the carrier. The obtaining in action 202 may comprise one or more of actions 203 and 204. This action is similar to action 202.

Action 702

The wireless device 120 may receive the information about the carrier from the radio network node 110, wherein the information about the carrier is associated with the mapping scheme. This action is similar to action 203.

The information about the carrier may comprise one or more of:

a first indication for indicating the carrier type;
release information of the carrier;
configuration of the carrier;
a second indication for indicating the second transmission bandwidth;
a third indication for indicating a type of the mapping scheme applied
to the carrier by the radio network node 110; and
a carrier frequency of the carrier.

Action 703

The wireless device 120 may receive a transmission on BCH from the radio network node 110. The wireless device 120 may receive synchronization and/or reference signals. This action is similar to action 204.

Action 704a

When the transmission on BCH is received in action 703, the wireless device 120 may determine the information about the carrier based on a scrambling mask of a CRC of the transmission or a CRC of the transmission. This action is similar to action 205a.

Action 704b

When the synchronization and/or reference signals are received in action 703, the wireless device 120 may determine the information about the carrier based on duration between the synchronization and/or reference signals. This action is similar to action 205b.

Action 705

The wireless device 120 determines a mapping scheme for mapping the set of enumerable elements to frequency ranges based on the information about the carrier. This action is similar to action 206.

Each respective frequency range may comprise at least one subcarrier or a respective set of 12 contiguous subcarriers of a plurality of sets of 12 contiguous subcarriers extending over at least the first transmission bandwidth.

The mapping scheme may map a respective element associated with the set of enumerable elements to a respective frequency range from among the frequency ranges.

The frequency ranges may extend over the first transmission bandwidth.

An element with a least element number associated with the set of enumerable elements may be mapped to a particular frequency range from among the frequency ranges.

The particular frequency range may be located at a center frequency of a center of the first transmission bandwidth.

Elements associated with the set of enumerable elements increasing from the least element number may be mapped towards higher and lower frequencies relative to the center frequency, alternatingly.

The mapping scheme may further map virtual enumerable elements to frequency ranges via the set of enumerable elements.

The mapping scheme may further map the set of enumerable elements to frequency ranges via a further set of enumerable elements associated with the first transmission bandwidth.

The element number of each element associated with the further set of enumerable elements may be determined by subtracting an offset from the element number of an element associated with the set of enumerable elements.

The offset may be based on a difference between a greatest element number of an element associated with the set of enumerable elements and a greatest element number of an element associated with the further set of enumerable elements, wherein the offset is rounded to an integer. The offset may further be determined based on one or more of:

time parameters;
subframe number;
radio frame number;
identification of the wireless device 120;
identification of cell of the radio network node 110.

Action 706

The wireless device 120 may send to the radio network node 110, a request for access to the radio network node 110. Using the obtained mapping scheme the device can also receive transmission from the network node. This action is similar to action 207.

Figure 8:
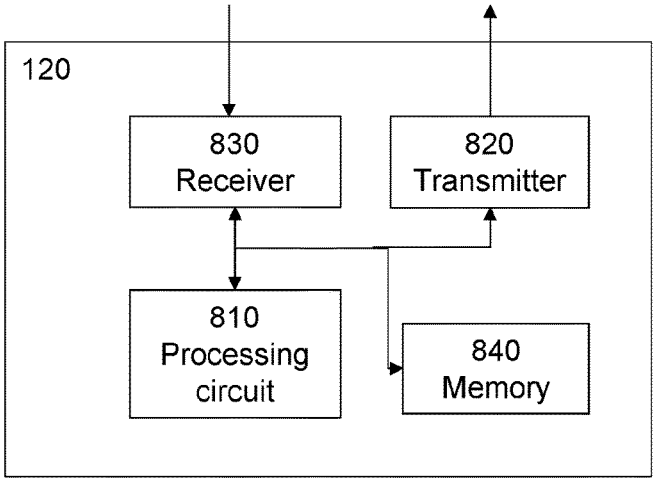
FIG. 8 is a block diagram illustrating embodiments of the wireless device.

FIG. 8 illustrates embodiments of the wireless device 120 when configured to perform the embodiments described in FIG. 3 and/or 7. Thus, the wireless device 120 is configured to enable access to a radio network node 110.

As mentioned, the wireless device 120 supports a first transmission bandwidth. The radio network node 110 operates a carrier with a second transmission bandwidth. A set of enumerable elements is associated with the second transmission bandwidth. The first transmission bandwidth is narrower than the second transmission bandwidth.

The wireless device 120 comprises a processing circuit 810 configured to obtain information about the carrier, and to determine a mapping scheme for mapping the set of enumerable elements to frequency ranges based on the information about the carrier.

The processing circuit 810 may further be configured to receive the information about the carrier from the radio network node 110. The information about the carrier may be associated with the mapping scheme. The information about the carrier may comprise one or more of:

a first indication for indicating the carrier type;

release information of the carrier;

configuration of the carrier;

a second indication for indicating the second transmission bandwidth;

a third indication for indicating a type of the mapping scheme applied to the carrier by the radio network node 110; and a carrier frequency of the carrier.

The processing circuit 810 may further be configured to receive a transmission on BCH from the radio network node 110 and to determine the information about the carrier based on a scrambling mask of a CRC of the transmission or a CRC of the transmission.

The processing circuit 810 may further be configured to receive synchronization and/or reference signals, and to determine the information about the carrier based on duration between the synchronization and/or reference signals.

The processing circuit 810 may further be configured to send, to the radio network node 110, a request for access to the radio network node 110.

The processing circuit 810 may further be configured to receive transmissions from the radio network node 110 using the mapping scheme.

The processing circuit 810 may be a processing unit, a processor, an application specific integrated circuit (ASIC), a field-programmable gate array (FPGA) or the like. As an example, a processor, an ASIC, an FPGA or the like may comprise one or more processor kernels.

The mapping scheme may map a respective element associated with the set of enumerable elements to a respective frequency range from among the frequency ranges. The frequency ranges may extend over the first transmission bandwidth.

Each respective frequency range may comprise at least one subcarrier, or a respective set of 12 contiguous subcarriers of a plurality of sets of 12 contiguous subcarriers extending over at least the first transmission bandwidth.

An element with a least element number associated with the set of enumerable elements may be mapped to a particular frequency range from among the frequency ranges.

The particular frequency range may be located at a center frequency of a center of the first transmission bandwidth.

Elements associated with the set of enumerable elements and increasing from the least element number, may be mapped towards higher and lower frequencies relative to the center frequency, alternatingly.

The mapping scheme may further map virtual enumerable elements to frequency ranges via the set of enumerable elements.

The mapping scheme may further map the set of enumerable elements to frequency ranges via a further set of enumerable elements associated with the first transmission bandwidth.

The element number of each element associated with the further set of enumerable elements may be determined by subtracting an offset from the element number of an element associated with the set of enumerable elements.

The offset may be based on a difference between a greatest element number of an element associated with the set of enumerable elements and a greatest element number of an element associated with the further set of enumerable elements, wherein the offset is rounded to an integer. The offset may further be determined based on one or more of:

time parameters;

subframe number;

radio frame number;

identification of the wireless device 120;

identification of cell of the radio network node 110;

The wireless device 120 further comprises a transmitter 820, which may be configured to send one or more of the request for access and other numbers, values or parameters described herein.

The wireless device 120 further comprises a receiver 830, which may be configured to receive one or more of the information about the carrier, the transmission, the synchronization and/or reference signals and other numbers, values or parameters described herein.

The wireless device 120 further comprises a memory 840 for storing software to be executed by, for example, the processing circuit. The software may comprise instructions to enable the processing circuit to perform the method in the wireless device 120 as described above in conjunction with FIG. 3 and/or 7. The memory may be a hard disk, a magnetic storage medium, a portable computer diskette or disc, flash memory, random access memory (RAM) or the like. Furthermore, the memory may be an internal register memory of a processor.

Figure 9:
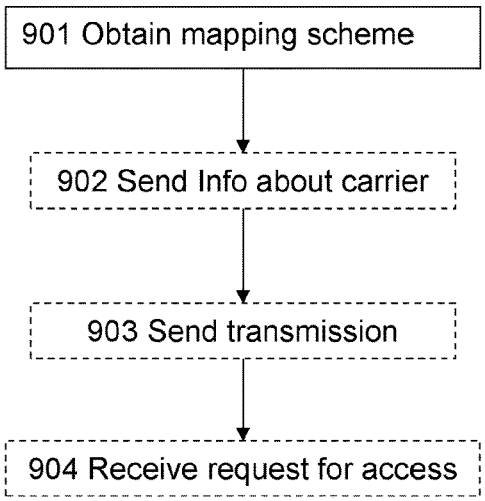
FIG. 9 is a flowchart illustrating embodiments of the method in the radio network node.

With reference to FIG. 9, embodiments of the method in the radio network node 110 for enabling the wireless device 120 to enable access to the radio network node 110 are described.

As mentioned, the wireless device 120 supports a first transmission bandwidth. The radio network node 110 operates a carrier with a second transmission bandwidth. A set of enumerable elements is associated with the second transmission bandwidth. The first transmission bandwidth is narrower than the second transmission bandwidth.

Action 901

The radio network node 110 obtains 201 a mapping scheme for mapping the set of enumerable elements to frequency ranges. The mapping scheme maps a respective element associated with the set of enumerable elements to a respective frequency range from among the frequency ranges. The frequency ranges extend over the first transmission bandwidth. An element with a least element number and associated with the set of enumerable elements is mapped to a particular frequency range from among the frequency ranges. The particular frequency range is located at a center frequency of a center of the first transmission bandwidth. Elements associated with the set of enumerable elements increasing from the least element number are mapped towards higher and lower frequencies relative to the center frequency, alternatingly. This action is similar to action 201.

The mapping scheme may further map virtual enumerable elements to frequency ranges via the set of enumerable elements.

Each respective frequency range may comprise at least one subcarrier or a respective set of 12 contiguous subcarriers of a plurality of sets of 12 contiguous subcarriers extending over at least the first transmission bandwidth.

Action 902

The radio network node 110 may send information about the carrier to the wireless device 120. The information about the carrier may relate to the obtained mapping scheme. This action is similar to action 203.

The information about the carrier may comprise one or more of:

a first indication for indicating the carrier type;

release information of the carrier;

configuration of the carrier;

a second indication for indicating the second transmission bandwidth;

a third indication for indicating a type of the mapping scheme applied to the carrier by the radio network node 110; and a carrier frequency of the carrier.

Action 903

The radio network node 110 may send a transmission. This action is similar to action 204.

Action 904

The radio network node 110 may receive, from the wireless device 120, a request for access to the radio network node 110. This action is similar to action 207.

Figure 10:
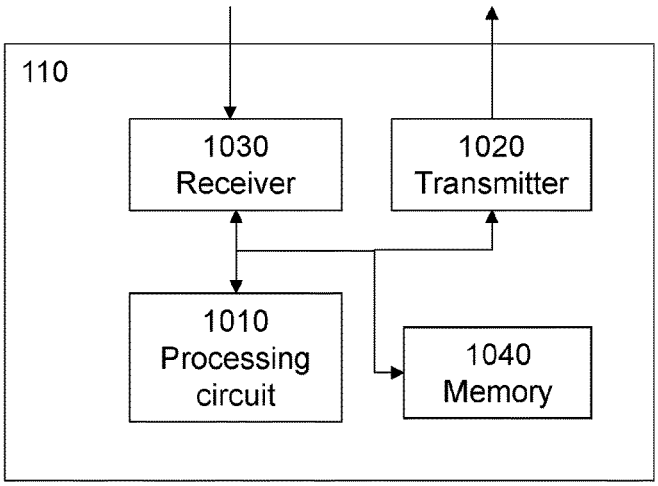
FIG. 10 is another block diagram illustrating embodiments of the radio network node.

FIG. 10 illustrates embodiments of the radio network node 110 when configured to perform the embodiments described in FIG. 3 and/or 9. Thus, the radio network node 110 is configured to enable the wireless device 120 to enable access to the radio network node 110.

As mentioned, the wireless device 120 supports a first transmission bandwidth. The radio network node 110 operates a carrier with a second transmission bandwidth. A set of enumerable elements is associated with the second transmission bandwidth. The first transmission bandwidth is narrower than the second transmission bandwidth.

The radio network node 110 comprises a processing circuit 1010 configured to obtain a mapping scheme for mapping the set of enumerable elements to frequency ranges. The mapping scheme maps a respective element associated with the set of enumerable elements to a respective frequency range from among the frequency ranges. The frequency ranges extend over the first transmission bandwidth. An element with a least element number associated with the set of enumerable elements is mapped to a particular frequency range from among the frequency ranges. The particular frequency range is located at a center frequency of a center of the first transmission bandwidth. Elements associated with the set of enumerable elements increasing from the least element number are mapped towards higher and lower frequencies relative to the center frequency, alternatingly.

Each respective frequency range may comprise at least one subcarrier or a respective set of 12 contiguous subcarriers of a plurality of sets of 12 contiguous subcarriers extending over at least the first transmission bandwidth.

The mapping scheme may further map virtual enumerable elements to frequency ranges via the set of enumerable elements.

Furthermore, the processing circuit 1010 is configured to send information about the carrier to the wireless device 120. The information about the carrier relates to the obtained mapping scheme. The information about the carrier may comprise one or more of:

a first indication for indicating the carrier type;

release information of the carrier;

configuration of the carrier;

a second indication for indicating the second transmission bandwidth;

a third indication for indicating a type of the mapping scheme applied to the carrier by the radio network node 110; and a carrier frequency of the carrier.

The processing circuit 1010 may further be configured to receive, from the wireless device 120, a request for access to the radio network node 110.

The processing circuit 1010 may be a processing unit, a processor, an application specific integrated circuit (ASIC), a field-programmable gate array (FPGA) or the like. As an example, a processor, an ASIC, an FPGA or the like may comprise one or more processor kernels.

The radio network node 110 further comprises a transmitter 1020, which may be configured to send one or more of the information about the carrier, the transmission, the synchronization and/or reference signals and other numbers, values or parameters described herein.

The radio network node 110 further comprises a receiver 1030, which may be configured to receive one or more of the request for access and other numbers, values or parameters described herein.

The radio network node 110 further comprises a memory 1040 for storing software to be executed by, for example, the processing circuit. The software may comprise instructions to enable the processing circuit to perform the method in the radio network node 110 as described above in conjunction with FIG. 3 and/or 9. The memory may be a hard disk, a magnetic storage medium, a portable computer diskette or disc, flash memory, random access memory (RAM) or the like. Furthermore, the memory may be an internal register memory of a processor.

As used herein, the terms "number" and "value" may be any kind of digit, such as binary, real, imaginary or rational number or the like. Moreover, "number" and "value" may be one or more characters, such as a letter or a string of letters. "Number" and "value" may also be represented by a bit string.

Even though embodiments of the various aspects have been described, many different alterations, modifications and the like thereof will become apparent for those skilled in the art. The described embodiments are therefore not intended to limit the scope of the present disclosure.

The invention claimed is:

[1. A method in a wireless device, said wireless device supporting a first transmission bandwidth associated with a first set of enumerable elements, for enabling access to a radio network node, the method comprising:

obtaining information about a carrier operated by the radio network node, wherein:

the carrier has a second transmission bandwidth associated with a second set of enumerable elements; and the second transmission bandwidth is wider than the first transmission bandwidth; and based on the information about the carrier, determining a mapping scheme for mapping the first set of enumerable elements, associated with the first transmission bandwidth, to a subset of the second set of enumerable elements associated with the second transmission bandwidth, wherein the mapping scheme comprises:

mapping a first enumerable element of the first set to an enumerable element of the second set that corresponds to a center frequency of the second transmission bandwidth; and mapping, in an alternating manner, subsequent enumerable elements of the first set to enumerable elements, of the second set, that correspond to frequencies increasingly higher and lower than the center frequency of the second transmission bandwidth.]

[2. The method of claim 1, wherein the enumerable elements comprising the first set and the second set correspond to one of resource blocks and sequence elements.]

[3. The method of claim 1, wherein the obtaining comprises receiving the information about the carrier from the radio network node, and wherein the information about the carrier is associated with the mapping scheme and comprises one or more of:

a first indication for indicating a type of the carrier;

release information of the carrier;

configuration of the carrier;

a second indication for indicating the second transmission bandwidth;

a third indication for indicating a type of the mapping scheme applied to the carrier by the radio network node; and a carrier frequency of the carrier.]

[4. The method of claim 1, wherein the obtaining comprises:

receiving a transmission on a broadcast channel (BCH) from the radio network node; and determining the information about the carrier based on a scrambling mask of a cyclic redundancy check of the transmission or a cyclic redundancy check of the transmission.]

[5. The method of claim 1, wherein the obtaining comprises:

receiving synchronization and/or reference signals; and determining the information about the carrier based on a duration between the synchronization and/or reference signals.]

[6. The method of claim 1, wherein the first set extends over the first transmission bandwidth.]

[7. The method of claim 1, wherein the mapping scheme further comprises mapping virtual enumerable elements associated with the second set to the enumerable elements comprising the first set.]

8. A method in a wireless device, said wireless device supporting a first transmission bandwidth associated with a first set of enumerable elements, for enabling access to a radio network node, the method comprising:

obtaining information about a carrier operated by the radio network node, wherein:

the carrier has a second transmission bandwidth associated with a second set of enumerable elements; and the second transmission bandwidth is wider than the first transmission bandwidth; and based on the information about the carrier, determining a mapping scheme for mapping the first set of enumerable elements, associated with the first transmission bandwidth, to [a subset of] the second set of enumerable elements associated with the second transmission bandwidth, wherein[:] the mapping scheme is determined by [subtracting] *adding* an offset [from] *to* an element number of [each] *an* element associated with the [second] *first* set of enumerable elements[;] and the offset *is* determined [is based on] *as* an integer difference [between a greatest element number of elements associated with the second set of enumerable elements and a greatest element number of elements associated with the first set of enumerable elements] *based on the obtained information about a carrier;*

*mapping the first set of enumerable elements to the second set of enumerable elements, using the mapping scheme; and*

*receiving a transmission from the radio network node, using the second set of enumerable elements and the second transmission bandwidth.*

9. The method of claim 8, wherein the offset is further determined based on one or more of:

time parameters;

a subframe number;

a radio frame number;

an identification of the wireless device; and an identification of a cell of the radio network node.

10. The method of claim [1] *8*, wherein each enumerable element of the first set and the second set corresponds to:

at least one subcarrier, or a respective set of 12 contiguous subcarriers of a plurality of sets of 12 contiguous subcarriers extending over at least the first transmission bandwidth.

[11. The method of claim 1, further comprising sending, to the radio network node, a request for the access to the radio network node.]

[12. A method in a radio network node, said radio network node operating a carrier with a second transmission bandwidth associated with a second set of enumerable elements, for enabling a wireless device to access the radio network node, the method comprising:

obtaining a mapping scheme for mapping a subset of the second set of enumerable elements to a first set of enumerable elements corresponding to a first transmission bandwidth supported by the wireless device, wherein the second transmission bandwidth is wider than the first transmission bandwidth, and wherein the mapping scheme comprises:

mapping a first enumerable element of the first set to an enumerable element, of the second set, that corresponds to a center frequency of the second transmission bandwidth; and mapping, in an alternating manner, subsequent enumerable elements of the first set to enumerable elements, of the second set, that correspond to frequencies increasingly higher and lower than the center frequency of the second transmission bandwidth; and sending information about the carrier to the wireless device, wherein the information about the carrier relates to the obtained mapping scheme.]

[13. The method of claim 12, wherein the enumerable elements comprising the first set and the second set correspond to one of resource blocks and sequence elements.]

[14. The method of claim 12, wherein the information about the carrier comprises one or more of:

a first indication for indicating a type of the carrier;

release information of the carrier;

configuration of the carrier;

a second indication for indicating the second transmission bandwidth;

a third indication for indicating a type of the mapping scheme applied to the carrier by the radio network node; and a carrier frequency of the carrier.]

[15. The method of claim 12, wherein the mapping scheme further comprises mapping virtual enumerable elements associated with the second set to the enumerable elements comprising the first set.]

[16. The method of claim 12, further comprising receiving, from the wireless device, a request for the access to the radio network node.]

[17. The method of claim 12, wherein each enumerable element of the first set and the second set corresponds to:

at least one subcarrier, or a respective set of 12 contiguous subcarriers of a plurality of sets of 12 contiguous subcarriers extending over at least the first transmission bandwidth.]

[18. A wireless device, said wireless device supporting a first transmission bandwidth associated with a first set of enumerable elements, configured to enable access to a radio network node, the wireless device comprising:

a processing circuit configured to:

obtain information about a carrier operated by the radio network node, wherein:

the carrier has a second transmission bandwidth associated with a second set of enumerable elements; and the second transmission bandwidth is wider than the first transmission bandwidth; and based on the information about the carrier, determine a mapping scheme for mapping the first set of enumerable elements, associated with the first transmission bandwidth, to a subset of the second set of enumerable elements associated with the second transmission bandwidth, wherein the mapping scheme comprises:

mapping a first enumerable element of the first set to an enumerable element, of the second set, that corresponds to a center frequency of the second transmission bandwidth; and mapping, in an alternating manner, subsequent enumerable elements of the first set to enumerable elements, of the second set, that correspond to frequencies increasingly higher and lower than the center frequency of the second transmission bandwidth.]

[19. The wireless device of claim 18, wherein the enumerable elements comprising the first set and the second set correspond to one of resource blocks and sequence elements.]

[20. The wireless device of claim 18, wherein the processing circuit is further configured to receive the information about the carrier from the radio network node, and wherein the information about the carrier is associated with the mapping scheme and comprises one or more of:

a first indication for indicating a type of the carrier;

release information of the carrier;

configuration of the carrier;

a second indication for indicating the second transmission bandwidth;

a third indication for indicating a type of the mapping scheme applied to the carrier by the radio network node; and a carrier frequency of the carrier.]

[21. The wireless device of claim 18, wherein the processing circuit further configured to:

receive a transmission on a broadcast channel (BCH) from the radio network node; and determine the information about the carrier based on a scrambling mask of a cyclic redundancy check of the transmission or a cyclic redundancy check of the transmission.]

[22. The wireless device of claim 18, wherein the processing circuit is further configured to:

receive synchronization and/or reference signals; and determine the information about the carrier based on a duration between the synchronization and/or reference signals.]

[23. The wireless device of claim 18, wherein the first set extends over the first transmission bandwidth.]

[24. The wireless device of claim 18, wherein the mapping scheme further comprises mapping virtual enumerable elements associated with the second set to the enumerable elements comprising the first set.]

25. A wireless device, said wireless device supporting a first transmission bandwidth associated with a first set of enumerable elements, configured to enable access to a radio network node, the wireless device comprising:

a processing circuit configured to:

obtain information about a carrier operated by the radio network node, wherein:

the carrier has a second transmission bandwidth associated with a second set of enumerable elements; and the second transmission bandwidth is wider than the first transmission bandwidth; [and]

based on the information about the carrier, determine a mapping scheme for mapping the first set of enumerable elements, associated with the first transmission bandwidth, to [a subset of] the second set of enumerable elements associated with the second transmission bandwidth, wherein[:] the mapping scheme is determined by [subtracting] *adding* an offset [from] *to* an element number of [each] *an* element associated with the [second] *first* set of enumerable elements[;] and the offset is determined [based on] *as* an integer difference [between a greatest element number of elements associated with the second set of enumerable elements and a greatest element number of elements associated with the first set of enumerable elements] *based on the obtained information about a carrier;*

*map the first set of enumerable elements to the second set of enumerable elements, using the mapping scheme; and*

*receive a transmission from the radio network node, using the second set of enumerable elements and the second transmission bandwidth.*

26. The wireless device of claim 25, wherein the offset is further determined based on one or more of:

time parameters;

a subframe number;

a radio frame number;

an identification of the wireless device; and an identification of a cell of the radio network node.

27. The wireless device of claim [18] *25*, wherein each enumerable element of the first set and the second set corresponds to:

at least one subcarrier, or a respective set of 12 contiguous subcarriers of a plurality of sets of 12 contiguous subcarriers extending over at least the first transmission bandwidth.

[28. The wireless device of claim 18, wherein the processing circuit is further configured to send, to the radio network node, a request for the access to the radio network node.]

[29. A radio network node, said radio network node operating a carrier with a second transmission bandwidth associated with a second set of enumerable elements, configured to enable a wireless device to access to the radio network node, the radio network node comprising:

a processing circuit configured to:

obtain a mapping scheme for mapping a subset of the second set of enumerable elements to a first set of enumerable elements corresponding to a first transmission bandwidth supported by the wireless device, wherein the second transmission bandwidth is wider than the first transmission bandwidth, and wherein the mapping scheme comprises:

mapping a first enumerable element of the first set to an enumerable element, of the second set, that corresponds to a center frequency of the second transmission bandwidth; and mapping, in an alternating manner, subsequent enumerable elements of the first set to enumerable elements, of the second set, that correspond to frequencies increasingly higher and lower than the center frequency of the second transmission bandwidth; and send information about the carrier to the wireless device, wherein the information about the carrier relates to the obtained mapping scheme.]

[30. The radio network node of claim 29, wherein the enumerable elements comprising the first set and second set correspond to one of resource blocks and sequence elements.]

[31. The radio network node of claim 29, wherein the information about the carrier comprises one or more of:

a first indication for indicating a type of the carrier;

release information of the carrier;

configuration of the carrier;

a second indication for indicating the second transmission bandwidth;

a third indication for indicating a type of the mapping scheme applied to the carrier by the radio network node; and a carrier frequency of the carrier.]

[32. The radio network node of claim 29, wherein the mapping scheme further comprises mapping virtual enumerable elements associated with the second set to the enumerable elements comprising the first set.]

[33. The radio network node of claim 29, wherein the processing circuit is further configured to receive, from the wireless device, a request for the access to the radio network node.]

[34. The radio network node of claim 29, wherein each enumerable element of the first set and the second set corresponds to:

at least one subcarrier, or a respective set of 12 contiguous subcarriers of a plurality of sets of 12 contiguous subcarriers extending over at least the first transmission bandwidth.]

* * * * *